United States Patent Office 3,661,839
Patented May 9, 1972

3,661,839
HEAT CURABLE GLASS FIBER FILLED POLY-
VINYL CHLORIDE COMPOSITIONS
Oskar E. H. Klopfer, Baton Rouge, La., assignor to Ethyl
Corporation, New York, N.Y.
No Drawing. Filed Mar. 2, 1970, Ser. No. 15,874
Int. Cl. C08f 45/72, 47/12
U.S. Cl. 260—41 AG                               4 Claims

ABSTRACT OF THE DISCLOSURE

A cross-linked, heat stable, glass filled polyvinyl halide composition and a process for the preparation thereof. The composition is prepared by mixing together polyvinyl halide resin, a stabilizer, a lubricant, a cross-linkable monomer, an inhibitor, and glass fibers to form a dry blend which is milled on a hot, two-roll mill to form a rigid sheet. The sheet is heat treated to increase deflection temperature.

BACKGROUND OF THE INVENTION

This invention relates to cross-linked, glass filled polyvinyl halides and to processes for the preparation thereof.

Polyvinyl halide compositions are widely used in the manufacture of coatings, flexible films, and rigid sheet. During all processes of manufacture, the sensitivity to heat of these polymers requires special precautions to be taken. Normally, this fault is dealt with by compounding and milling the composition at the requisite temperature as quickly as possible and by incorporating in the composition a suitable stabilizing agent. Processing temperature can be reduced by increasing the plasticizer content of the composition, but this normally produces a material which may be softer and more flexible than that which is required.

Polyvinyl chloride sheeting and coatings are particularly limited in use by the undesirably low temperatures at which the composition begins to soften. Polyvinyl chloride resins are used extensively as insulation for electrical conductors and other potentially high temperature applications. However, there are a number of applications where resistance to elevated temperatures is a requirement which the thermoplastic polyvinyl chloride resins cannot satisfy. This is due to the fact that rigid polyvinyl chloride compounds begin to soften and readily deform or decompose under load usually in the range of 80 to 125° C. This is equivalent to a standard heat deflection temperature range as defined in ASTM D648–56 (1961) of from about 65° C. to 75° C. under a load of 264 pounds per square inch (18.5 kg./cm.$^2$).

Many attempts have been made to effect cross-linking of polyvinyl halide resins to make the resins more resistant to high temperatures. U.S. Pat. 3,351,604 describes several of these attempts, and in turn discloses methods for this purpose. This patent describes the use of certain plasticizers in a mixture with polyvinyl halide and triallyl cyanurate, either alone or in the presence of a peroxide initiator. Curing is effected by the use of heat when peroxides are present or high-energy ionizing radiation in their absence.

U.S. Pat. 3,125,546 discloses high temperature curing of a substantially linear polymer with a minor portion of a polyfunctional allyl monomer in the presence of a free radical polymerization initiator. Some of the polymers were irradiated at a dose level of about 20 megarads in order to effect a cure of the polymeric resins.

One of the most important advantages to be derived from the curing of cross-linked polyvinyl chloride is a substantial increase in heat stability. Heat stability is generally measured in terms of heat deflection temperature.

An object of the present invention is to increase heat stability while retaining as many as possible of the other desirable properties in the resultant cured polymer.

Irradiation methods are much more expensive in general than methods not employing irradiation such as the present invention. Accordingly, another object of the present invention is to increase heat stability at the lowest possible cost.

These and related problems are solved by the present invention which is more fully described in the following specification and claims.

SUMMARY OF THE INVENTION

It has been discovered that rigid, cross-linked glass filled polyvinyl halide compositions having extremely high deflection temperatures may be prepared by heat curing polyvinyl halide compositions containing a polyvinyl halide, a cross-linked monomer, and glass without the necessity of employing peroxides in the composition or of irradiating the composition. A lubricant, a stabilizer, and an inhibitor are preferably included in the composition.

Unexpectedly it has also been discovered that the above composition may be prepared by mixing the components thereof by standard techniques and at ordinary temperatures. The resultant dry blend may be molded or milled in any desired shape. The finished product is cured by heating in a conventional oven, thus eliminating the need for special extrusion or molding equipment.

DESCRIPTION OF THE PREFERRED EMBODIMENTS

Vinyl halide resins employed in the practice of the present invention may be either the homopolymer or copolymer of a major portion of the vinyl halide with an ethylenically unsaturated monomer copolymerizable therewith. In addition, the vinyl halide resin may have grafted thereon monomers such as methacrylates, acrylonitriles, and the like. Among the polyvinyl halides suitable for the invention are polyvinyl chloride, polyvinyl fluoride, and polyvinyl bromide. The most preferred polyvinyl halide is polyvinyl chloride.

Suitable ethylenicaly unsaturated monomers copolymerizable with the vinyl halides are the alpha olefins such as ethylene, for example. A suitable vinyl chloride-ethylene copolymer contains from about 0.5 to about 12 weight percent ethylene. In addition, vinyl esters of the lower saturated aliphatic monocarboxylic acids containing up to about 6 carbon atoms are equally suitable as comonomers. Suitable among the vinyl esters are vinyl acetate, vinyl propionate, vinyl hexanoate, and the like. A particularly preferred vinyl ester is vinyl acetate.

There are many other suitable monomers copolymerizable with the vinyl halides. Included among the other suitable monomers are the vinyl alkyl ethers. The vinyl alkyl ethers useful in the present invention are vinyl cetyl ether, vinyl ethyl ether, vinyl propyl ether, and the like. Generally, the alkyl present in the vinyl ether may have up to about 20 carbon atoms.

The most preferred vinyl halide resin is polyvinyl chloride. Suitable polyvinyl chloride resins may be prepared by conventional polymerization processes, such as suspension, emulsion, or bulk. A suitable polyvinyl chloride emulsion resin is EH–255 sold by Ethyl Corporation. EH–255 has a particle size distribution by weight of about 3% between 105 microns and 88 microns, about 6% between 88 microns and 74 microns, 27% between 74 microns and 44 microns, and about 64% smaller than 44 microns in diameter.

Suspension resins are especially useful in preparing the rigid, cross-linked resins of the present invention. Suitable polyvinyl chloride suspension resins are SMF–225 and SM–175 sold by Ethyl Corporation. SMF–225 has a particle size distribution by weight of about 2 to 5% smaller than 74 microns, about 5 to 10% between 105 and 74 microns, about 30 to 35% between 149 and 105 microns, about 50 to 55% between 177 and 149 microns, and about 5% between 250 and 177 microns. SM–175 has a particle size distribution of about 5% between 250 and 177 microns, about 35 to 40% between 177 and 150 microns, about 40 to 45% between 150 and 105 microns, about 10 to 15% between 105 and 74 microns and about 10% below 74 microns in diameter.

Particularly preferred polyvinyl chloride resins sold commercially are SM–250 and SM–225 suspension polyvinyl chloride resins sold by Ethyl Corporation. SM–250 and SM–225 have particle size distributions by weight of about 5% between about 246 and about 175 microns in diameter, about 50% between about 175 and about 149 microns in diameter, about 35% between about 149 and 105 microns in diameter, and about 10% between about 105 and about 74 microns in diameter.

The cross-linkable monomers suitable for use in the present invention include polyol polymethacrylates, polyallyl isocyanurates, polyallyl alkyl isocyanurates, polyallyl aromatic isocyanurates, polyallyl cyanurates, polyallyl polycarboxylates, and polyvinyl aromatics.

Typical examples of polyol polymethacrylates are tetramethylene glycol dimethacrylate, triethylene glycol dimethacrylate, ethylene glycol dimethacrylate, polyethylene glycol dimethacrylate, trimethylolpropane trimethacrylate, trimethylolethane trimethacrylate, glycerol trimethacrylate, pentaerythritol tetramethacrylate, dipentaerythritol hexamethacrylate, sorbitol hexamethacrylate, and 2,2,4-trimethyl-1,3-pentanediol dimethacrylate. The most preferred of these compounds is trimethylolpropane trimethacrylate.

Suitable polyallyl alkyl and aromatic isocyanurates are diallyl methyl isocyanurate, diallyl ether isocyanurate, and the like, the alkyl radical having up to about 8 carbon atoms. Diallyl phenyl isocyanurate is also suitable in the present invention. In addition to these, triallyl isocyanurate is quite satisfactory, and is one of the more preferred monomers.

Suitable polyallyl cyanurates are diallyl methyl cyanurate, diallyl ethyl cyanurate, diallyl propyl cyanurate, and the like, the alkyl moieties having up to about 8 carbon atoms. Diallyl phenyl cyanurate has been found to be an acceptable monomer for use in the present invention.

Advantageously, economies in practicing the invention may be realized by employing polyallyl polycarboxylate monomers either alone or in combination with the other monomers taught herein. Suitable polyallyl polycarboxylates are diallyl phthalate, diallyl sebacate, diallyl adipate, triallyl trimesate, triallyl trimelitate, tetraallyl pyromellitate, triallyl citrate, and the like. More preferred polycarboxylates are diallyl phthalate, diallyl sebacate, and triallyl citrate. Of these, the most preferred monomer is diallyl phthalate.

The polyallyl polycarboxylate monomers are especially beneficial when used in conjunction with other monomers, such as trimethylolpropane trimethacrylate, triallyl isocyanurate, triallyl cyanurate, and the like. This conjoint use of monomers in the invention is most advantageous when diallyl phthalate is used in mixture with a monomer such as trimethylolpropane trimethacrylate or triallyl isocyanurate. Acceptable results have been obtained using up to about 80 weight percent, based on total monomers, of the polyallyl polycarboxylate.

Other suitable monomers are polyvinyl aromatics, such as divinyl benzene, divinyl naphthalene and divinylbiphenyl, as well as certain polyacrylates, such as ethylene glycol diacrylate, triethylene glycol diacrylate, tetraethylene glycol diacrylate, trimethylolpropane triacrylate, glycerol triacrylate, pentaerythritol tetraacrylate, and the like.

Generally, the allyl and methallyl acrylates or methacrylates are equally suitable in practicing the invention. Exemplary of these monomers are methallyl acrylate, methallyl methacrylate, allyl acrylate, and allyl methacrylate.

Suitable inhibitors include hydroquinone, 2,6-ditertiarybutyl paracresol, 2,6-ditertiarybutyl phenol (and derivatives) and the like. A preferred inhibitor is monomethyl ether of hydroquinone, hereinafter referred to as MEHQ. Particularly preferred is the combination of tert-butylcatechol, hereinafter referred to as t-BC.

A heat stabilizer may be employed in preparing crosslinked compositions in accordance with the present invention to prevent dehydrohalogenation of the vinyl halide resin. Typical of the stabilizers which may be employed are stearates of lead, barium, cadmium, epoxodized linseed oil, lead phosphites, and the like. A particularly preferred stabilizer is Dyphos, a dibasic lead phosphite sold by National Lead Company.

Lubricants may also be added to the composition. Typical of the lubricants which are suitable are polyethylene wax, esters of carboxylic acids having $C=20$ to 26, where $C=$the number of carbon atoms in the compound, calcium stearate, butyl stearate, and the like. Stearic acid is particularly preferred.

The preferred filler is glass fiber. The glass fibers are preferably about ¼ inch in length. However, the fibers may suitably range from about ⅛ inch to about 2 inches in length. A particularly preferred length is from about ⅛ inch to about ¾ inch. The glass fibers may be monofilaments or multifilament strands. Any of the commercially available glass fibers may be used. A particularly preferred brand of glass fiber is HR–3129, manufactured by Pittsburgh Plate Glass Company.

In addition to using the glass fibers alone, other reinforcing agents and filler materials may be employed in conjunction therewith. Typically, the glass fibers are blended in an equal amount with another reinforcing agent or filler material such as a silicate, carbonate, asbestos, carbon black or other material.

Materials that have been found to be acceptable are Cabosil (Cabot Corporation), silica of millimicron size, microspheroidal silica gel, and carbon black. In addition, there are several commercially available materials made by coating calcium carbonate with fatty acid calcium salts which have been found to be especially useful in the present invention. When these compounds are used in the invention, it may be advantageous to employ any of several available bonding agents. A particularly good bonding agent for this purpose is γ-aminopropyltriethoxysilane, available commercially as "A–1100" (Union Carbide).

It is important that the various components of the cross-linked polyvinyl chloride composition be mixed together in certain proportions. The following disclosed proportions are given in parts by weight of the component per hundred parts by weight of vinyl chloride resin, which is hereinafter referred to as phr.

The composition may suitably contain from about 1 phr. to about 10 phr. of stabilizer. A particularly preferred range is from about 3 phr. to about 6 phr.

The cross-linkable monomer in the composition may suitably range from about 10 phr. to about 60 phr. A particularly preferred range is from about 20 phr. to about 30 phr.

The inhibitor may suitably may suitably range from about 0.01 phr. to about 1 phr. A particularly preferred range is from about 0.05 phr. to about 0.3 phr.

The lubricant may suitably range from about 0.5 phr. to about 2 phr. A particularly preferred range is from about 0.5 phr. to about 1.25 phr.

The composition may contain from about 15% to about 40% of glass filler. A particularly preferred range is from about 20% to about 30%.

According to the invention, the polyvinyl halide is blended with the glass fibers and cross-linkable monomer. The ingredients may be added in any order. Any conventional blender or extruder may be used to blend the ingredients. Typical of the suitable blenders or mixers are the Banbury, Hobart, Henschel, Papenmeier or Farrel. Typical of the various sulitable extruders are the NRM and the Egar.

The resultant resin-glass blend can be molded into semi-rigid articles by milling, extruding, injection molding, or compression molding. A preferred method is to mill the resin-glass blend into a sheet. The sheet may be diced into pellets and the pellets used for injection molding various articles.

The preferred mill for producing flat shapes is a two-roll mill operated at a temperature of about 380° F. The mill can be run at a temperature of about 350° F. to about 400° F., but preferably the mill is run from about 370° F. to about 390° F.

After the glass blend is formed into some article, the article must be heat cured to effect cross-linking. Heat curing may be carried out in any conventional oven. A suitable temperature range for heat curing is from about 125° C. to about 160° C. A preferred temperature range is from about 140° C. to about 150° C. The molded article to be heat cured may be left in the oven at the foregoing temperatures for about 10 to about 20 minutes, but preferably for about 15 minutes.

Various samples were prepared in accordance with the present invention. The ingredients were blended together and milled on a two-roll mill. The mill was run at a a temperature of about 380° F. The milled sheet was cut into test bars and heat cured at a temperature of about 140° C. to about 150° C. The samples were tested for deflection temperature under load by the method set forth in ASTM D648-56 (1961). This test measures the temperature at which the test bar is deflected 0.25 mm. while under constant load at 264 pounds per square inch. The results of the tests on the samples are listed in Table I.

EXAMPLE 27

100 parts of polyvinyl chloride (SMF-225 manufactured by Ethyl Corporation), 20 parts of trimethylolpropane trimethacrylate (Rohm and Haas X-980), 0.75 parts stearic acid, 0.04 parts of monomethyl ether of hydroquinone, and 41.5 parts of ¼ inch long glass fiber (Pittsburgh Plate Glass HR-3129) were mixed together in a Banbury mixer. The mixer was run at low speed until the temperature inside the chamber reached 360° F. The mixture was discharged from the mixer and a sample was milled to a sheet on a two-roll mill operated at a temperature of 350° F. The composition was compression molded, and test bars consisting of strips of dimensions 6" x ½" x ⅛" were cut for exposure to heat treatment. The samples were heated in a conventional oven for 15 minutes at 145° C., removed from the oven and allowed to cool at room temperature. Deflection temperature of the heat treated samples was 96.5° C. Before heat treating, the deflection temperature was 77° C.

Similar results are achieved when the polyvinyl chloride is replaced with a vinyl chloride-ethylene copolymer containing from about 10 weight percent ethylene.

EXAMPLE 28

A glass-dry blend was prepared by mixing together 100 parts of polyvinyl chloride (SMF-225 manufactured by Ethyl Corporation), 20 parts of trimethylolpropane trimethacrylate (Rohm and Haas X-980), 0.75 parts stearic acid, 0.04 parts of monomethyl ether of hydroquinone, and 41.5 parts of ¼ inch glass fibers (Pittsburgh Plate Glass HR-3129). The glass-dry blend was added to the first of four zones of a horizontal extruder (NRM manufactured by National Rubber Manufacturers). The first zone was heated to 280° F., the second zone to 300° F., the third zone to 325° F. and the fourth zone to 325° F. The die temperature was 325° F. Head pressure on the extruder was 3,500-5,500

TABLE I

| Number [1] | Parts polyvinyl chloride resin | | Trimethylol propane trimethacrylate parts | Glass filler, parts | Inhibitor [2] | | $DT_1$ [a] | $DT_2$ [b] |
|---|---|---|---|---|---|---|---|---|
| | | | | | Parts | Type | | |
| 1 | 100 | SM-225 | 20 | 41.5 | .04 | MEHQ | 106.0 | 108.0 |
| 2 | 100 | SM-225 | 20 | 41.5 | .04 | MEHQ | 101.0 | 105.0 |
| 3 | 100 | SM-175 | 20 | 41.5 | .04 | MEHQ | 82.5 | 94.5 |
| 4 | 100 | SM-225 | 20 | 41.9 | .06 | MEHQ | 74.0 | 96.0 |
| 5 | 100 | SM-225 | 20 | 41.9 | .04 | MEHQ | 87.5 | 117.0 |
| 6 | 100 | SM-225 | 15 | 40.2 | .03 | MEHQ | 90.5 | 113.0 |
| 7 | 100 | SM-225 | 25 | 43.6 | .05 | MEHQ | 85.0 | 110.0 |
| 8 | 100 | SM-225 | 25 | 43.6 | .03 .05 | t-BC MEHQ | >140.0 | >140.0 |
| 9 | 100 | SM-225 | 25 | 43.6 | .03 .05 | t-BC MEHQ | 104.0 | 153.5 |
| 10 | 100 | SM-225 | 25 | 70.4 | .05 | MEHQ | 71.0 | 97.5 |
| 11 | 100 | SM-225 | 20 | 41.9 | .04 | MEHQ | 87.5 | 117.0 |
| 12 | 100 | EH-255 | 20 | 41.9 | .04 | MEHQ | | 117.0 |
| 13 | 100 | SM-250 | 20 | 41.9 | .04 | MEHQ | 97.0 | 96.5 |
| 14 | 100 | SM-225 | 20 | 42 | .06 | MEHQ | | 91.0 |
| 15 | 100 | SM-225 | 20 | 42 | .04 | MEHQ | | 108.0 |
| 16 | 100 | SM-225 | 20 | 42 | .04 | MEHQ | | 131.0 |
| 17 | 100 | SM-250 | 12.5 | 39.1 | 0.01 | t-BC | 91.5 | 103.0 |
| 18 | 100 | SM-250 | 19 | 41.3 | 0.02 0.04 | t-BC MEHQ | 107.0 | 129.0 |
| 19 | 100 | SM-250 | 25 | 43.3 | 0.03 0.05 | t-BC MEHQ | 116.0 | 149.0 |
| 20 | 100 | SM-250 | 19 | 43.3 | .10 .04 | t-BC MEHQ | 119.0 | 123.5 |
| 21 | 100 | SM-250 | 19 | 41.3 | 0.05 0.04 | t-BC MEHQ | 91.5 | 119.0 |
| 22 | 100 | SMF-225 | 19 | 41.6 | 0.09 | MEHQ | 72.0 | 111.0 |
| 23 | 100 | SMF-225 | 25 | 43.6 | 0.03 0.05 | t-BC MEHQ | 94.5 | >130.0 |
| 24 | 100 | SMF-225 | 20 | 41.5 | .04 | MEHQ | 77.0 | 96.5 |
| 25 | 100 | SMF-225 | 20 | 41.5 | .04 | MEHQ | 82.0 | 97.0 |
| 26 | 100 | SMF-225 | 20 | 41.5 | .04 | MEHQ | 86.0 | 90.5 |

[1] All samples contained 0.75 parts by weight stearic acid.
[2] MEHQ=monomethyl ether of hydroquinone. t-BC=tert-Butyl catechol.
[a] Deflection temperature after molding.
[b] Deflection temperature after heat treating molded sample.

p.s.i. The extruder was operated at 20 r.p.m., and the resulting strands were cut to approximately ½ inch long pellets. The pellets were milled to sheet and then compression molded. The molded composition was cut into strips of 6" x ½" x ⅛" for exposure to heat treatment. The test bars were heat treated in a conventional oven for 15 minutes at 145° C. Deflection temperature of the bars before heat treatment was 82° C., and after heat treatment was 97° C.

Similar results are achieved when a vinyl chloride-vinyl acetate copolymer is substituted for polyvinyl chloride.

EXAMPLE 29

The procedure of Example 28 was repeated with the exception that the pellets were re-extruded through the same die and then compression molded. Deflection temperature of the composition before heat curing was 86.0° C., and after heat curing was 90.5°.

As can be seen from the above examples, heat curing results in a substantial increase in deflection temperatures. In addition, it can be seen that the preferred method of preparing the cross-linked polyvinyl chloride composition is by milling on a hot, two-roll mill and then compression molding prior to heat treatment.

The following Examples 30 through 32 demonstrate the effect of the amount of inhibitor upon deflection temperature. All of the compositions tested in Examples 30-32 contained 100 parts of polyvinyl chloride (SMF-225 manufactured by Ethyl Corporation), 20 parts of trimethylolpropane trimethacrylate (Rohm and Haas X-980), 41.5 parts of ¼ inch glass fibers (HR-3129 manufactured by Pittsburgh Plate Glass). Additionally, .02, 200, or 300 p.p.m. of monomethyl ether of hydroquinone (manufactured by Eastman Corporation) were added to Examples 30, 31, and 32, respectively. The ingredients were mixed in a conventional mixer and milled on a two-roll mill having a roll temperature of 380° F. to a sheet. The sheet was compression molded and test bars were cut therefrom in dimensions of 6" x ½" x ⅛". The test bars were then heat treated at 145° C. for 15 minutes. The following deflection temperatures resulted:

TABLE II

| Number | P.p.m. | DT |
|---|---|---|
| 30 | 285 MEHQ | 96.0 |
| 31 | 385 MEHQ | 117.0 |
| 32 | 485 MEHQ | 81.5 |

It can be seen that Example 31 yields the optimum deflection temperature, thereby indicating that the amount of inhibitor is critical. Example 32 contains more inhibitor than Example 31, whereas Example 30 contains less inhibitor than Example 31. The deflection temperature in Examples 30 and 32 are both lower than Example 31. Thus, the optimum inhibitor level is between about 285 and 385 parts per million.

It can be seen from Table I that the highest deflection temperatures are generally obtained when t-BC inhibitor is included in the glass-dry blend. The four highest deflection temperatures were obtained from cross-linked compositions which included t-BC (see Examples 8, 9, 19, and 23). The remainder of the examplesinwhicht-BC was employed yielded deflection temperatures of at least 123° C., with the exception of Example 17, in which the quantity of trimethylolpropane trimethacrylate was approximately one-half that of the other examples employing t-BC.

The compositions of the present invention are particularly useful for manufacturing plastic articles having high temperature and strength requirements, such as extruded plastic pipe for hot water, pipe fittings and valves. Some other uses are in the manufacture of injection molded articles, such as vessels, business machine housings and components, electrical motor housings and components.

What is claimed is:

1. A process for the manufacture of rigid, cross-linked vinyl halide compositions, consisting essentially of blending together:
    (a) 100 parts by weight of a vinyl halide resin selected from the group consisting of homopolymers of vinyl halides and copolymers of a major portion of a vinyl halide with an ethylenically unsaturated monomer copolymerizable therewith;
    (b) from about 10 to about 60 parts by weight of a cross-linkable monomer selected from the group consisting of polyol polymethacrylates, polyallyl isocyanurates, polyallyl alkyl isocyanurates, polyallyl aromatic isocyanurates, polyallyl cyanurates, polyallyl polycarboxylates, and polyvinyl aromatics;
    (c) from about 15 to about 40 percent by weight of a glass filler;
    (d) forming the blend of resin, monomer and glass into a semi-rigid article; and
    (e) heating said article to a temperature of from about 125° C. to about 160° C. for about 10 to about 20 minutes.

2. The process of claim 1 wherein said resin is polyvinyl chloride.

3. The process of claim 2 wherein said cross-linkable monomer is trimethylolpropane trimethacrylate.

4. The product produced by the process of claim 1.

References Cited

UNITED STATES PATENTS 3,542,661  11/1970  Klopfer et al.  ____ 260—884 X
3,247,289  4/1966  Sears  _____ 260—884

DONALD E. CZAJA, Primary Examiner

D. J. BARRACK, Assistant Examiner

U.S. Cl. X.R.

260—23 XA, 23.5 R, 28.5 D, 31.2 R, 41 R, 41 C, 41 A, 45.7 P, 45.95, 87.5 R, 87.5 C, 87.5 G, 92.8 A, 884